(12) United States Patent
Firey (10) Patent No.: US 8,187,350 B2
(45) Date of Patent: May 29, 2012

(54) ENGINE FUELS FROM COAL VOLATILE MATTER

(76) Inventor: Joseph Carl Firey, Seattle, WA (US)

( * ) Notice: Subject to any disclaimer, the term of this patent is extended or adjusted under 35 U.S.C. 154(b) by 610 days.

(21) Appl. No.: 12/454,640

(22) Filed: May 21, 2009

(65) Prior Publication Data
US 2010/0293847 A1    Nov. 25, 2010

(51) Int. Cl.
*C10B 1/00* (2006.01)
*F02C 3/28* (2006.01)

(52) U.S. Cl. .......... 48/197 R; 48/101; 48/119; 202/109; 110/229; 110/292; 110/233

(58) Field of Classification Search ............... 48/197 R, 48/101, 119; 202/108, 109; 110/292, 233
See application file for complete search history.

(56) References Cited

U.S. PATENT DOCUMENTS

| | | | | |
|---|---|---|---|---|
| 3,702,516 A | * | 11/1972 | Luckenbach | 48/206 |
| 4,270,467 A | * | 6/1981 | Drake | 110/216 |
| 4,397,656 A | * | 8/1983 | Ketkar | 48/202 |
| 5,145,490 A | * | 9/1992 | Sadowski | 48/197 R |
| 7,008,459 B1 | * | 3/2006 | Fraas et al. | 48/86 R |
| 7,892,303 B2 | * | 2/2011 | Firey | 48/101 |

* cited by examiner

*Primary Examiner* — Nina Bhat (57) ABSTRACT

Apparatus and a process are described for compressing superheated steam into porous coal chunks in a chamber, and, after a time interval, expanding this steam out of the chamber, and repeating this steam cycle of compression followed by expansion. Thusly heated by the steam, volatile matter separates from the solid coke portion of the coal and separate volatile matter and coke products can be produced from coal or biomass fuels. These volatile matter liquids and tars can be used as fuel components in slurry fuels, for internal combustion engines used in our surface transportation industries. These solid coke products can be used as boiler fuel in steam electric plants. In this way our large domestic reserves of coal can be used as a fuel source, not only for electric power generation, but also for our surface transportation needs.

9 Claims, 7 Drawing Sheets

ENGINE FUELS FROM COAL VOLATILE MATTER

CROSS REFERENCES TO RELATED APPLICATIONS

The invention described herein creates several fuel products, from coal and biomass, which are suitable for use in internal combustion engines equipped with fuel systems as described in the following U.S. patents and patent applications:
(1) U.S. Pat. No. 7,281,500, Supplementary Slurry Fuel Atomizer and Supply System, Firey, 2007.
(2) U.S. Pat. No. 7,418,927, Common Rail Supplementary Atomizer for Piston Engines, Firey, 2008.
(3) U.S. patent application, Rotary Residual Fuel Slurrifier, Ser. No. 11/796,714, filed 30 Apr. 2007, now U.S. Pat. No. 7,677,791, Joseph C. Firey, inventor.
(4) U.S. patent application, Modified Common Rail Fuel Injection System, Ser. No. 12/011,569, filed 29 Jan. 2008 now abandoned, Joseph C. Firey, inventor.
(5) U.S. patent application, Coke Burning Engine, Ser. No. 12/316,571, filed 15 Dec. 2008, pending, Joseph C. Firey, inventor.
  The refuel mechanisms described in the following U.S. patents can also be used for similar fuel transfer operations in the invention described herein:
(6) U.S. Pat. No. 4,653,436, Untimed Refuel and Ash Removal for Char Burning Engines, Firey, 1987.
(7) U.S. Pat. No. 5,485,812, Multiple Sources Refuel Mechanism, Firey, 1996.

BACKGROUND OF THE INVENTION

This invention is in the field of alternative fuels to power our critical transportation industries. The steam engine, using coal as the energy source, made the industrial revolution possible, and powered the early transportation systems. The more flexible internal combustion engine, using petroleum fuels, has since displaced coal and steam engines from transportation systems, both commercial and military. But petroleum reserves are limited, and petroleum energy is expensive, whereas coal reserves are very large, and coal energy is low cost. In energy units, worldwide coal reserves are about thirtyfold greater than worldwide petroleum reserves. Energy prices vary, but coal energy usually costs about one-tenth the cost of petroleum energy. As a result, many efforts are underway to derive fuels from coal which can be used in internal combustion engines.

Some examples of these efforts to adapt coal for use in internal combustion engines, in transportation applications, are as follows:
(1) Railroad locomotive diesel engines were operated experimentally on pulverized coal suspended in water slurries. Engine operation was reasonably satisfactory. However, excessive fuel injection nozzle wear resulted, perhaps from solid coal particle impact on nozzle surfaces, even when sapphire nozzle inserts were used. The results of these diesel engine experiments are summarized in the following publication: *Coal Fueled Diesel Engines,* 1993, edited by J. Caton and H. Webb, published by ASME, Publ. No. ICE, Vol 19.
(2) The Fischer-Tropsch process, for transforming coal into liquid hydrocarbon fuels, was developed, out of necessity, by Germany during World War II. Currently, South Africa and China are reported to be developing improved forms of this Fischer Tropsch process, in order to increase domestic supplies of transportation hydrocarbon fuels. Limited available information indicates that the overall energy efficiency of these coal to liquids processes are rather low, a large coal quantity yielding a small hydrocarbon fuel output.
(3) Selected coals, and biomass, have long been transformed into solid coke, by devolatilization in coke ovens, for use in the iron and steel industry. Devolatilization is a complex physical and chemical process, which separates solid coke from several volatile matter products, such as liquid carbonaceous fuels and tars. These volatile matter products are recovered in byproduct coke ovens, but are not currently used as fuels for internal combustion engines.

In the United States, the need for a reliable, long-term, domestic, source of transportation fuel, for commercial and military uses, has long been recognized. In America, domestic petroleum reserves are very limited, whereas domestic coal reserves are very large. Coal and biomass derived fuels, for transportation uses, could substantially improve our national defense and economic capabilities.

SUMMARY OF THE INVENTION

Apparatus is described for repeatedly compressing superheated steam into coal and biomass fuel, in a pressure vessel container, and subsequently releasing the steam. This steam cycle is repeated several times and substantially increases the coal and biomass temperature. Coal and biomass at this elevated temperature undergoes a complex devolatilization process, which separates a volatile matter product from a devolatilized coke product.

The volatile matter leaves the pressure vessel container with the steam during each steam release. Separation of the volatile matter into a gas fuel, a liquid fuel and a tar fuel, can be carried out in a tar centrifuge separator followed by a steam condenser and separator. Alternatively, this same volatile matter separation can be carried out in a barometric condenser followed by a flotation separator tank.

The liquid volatile matter fuel, and tar volatile matter fuel, are suitable for use, as slurries, in surface transportation diesel engines, equipped with modified fuel injection systems. The gas volatile matter fuel, and devolatilized coke fuel, can replace coal for use in steam electric power plants.

This invention can be used to efficiently supply economical fuels for internal combustion engines, used in commercial and military transportation applications, from our large reserves of coal, and also from non food farm harvest biomass.

BRIEF DESCRIPTION OF THE DRAWINGS

A schematic diagram of a coal and biomass devolatilization apparatus of this invention is shown in FIG. 1, including a steam boiler (88), a devolatilization reactor chamber (11), a tar centrifuge separator (36), and a surface condenser (38).

An example tar centrifuge separator is shown schematically in cross section in FIG. 2.

An example refuel transfer mechanism with seals is shown schematically in cross section in FIG. 3 and FIG. 4.

One type of surface condenser separator is illustrated schematically in cross section in FIG. 5.

The devolatilization apparatus of this invention shown schematically in FIG. 6 is similar to that shown in FIG. 1 and differs therefrom in using a barometric condenser separator apparatus (91), instead of a tar separator and surface condenser.

Details of a barometric condenser (91) and condensate receiver tank (90), are shown schematically in cross section in FIG. 7.

None of these drawings are to scale.

Engine Fuels from Coal Volatile Matter

Description of the Preferred Embodiments

The apparatus of this invention can be used to carry out a devolatilization process for separating carbonaceous fuels containing volatile matter, such as coal or biomass, into two or more separated products, one or more volatile matter products, and a devolatilized solid coke product. Several steam cycles of compression by highly superheated steam, followed by steam release, are applied to chunks of coal or biomass, contained within a pressure vessel devolatilization reactor chamber. The carbonaceous fuel is heated by direct contact with the superheated steam. When thusly heated, carbonaceous fuels, such as coal and biomass, undergo a complex devolatilization process involving evaporation of some components, liquefaction of other components, thermal cracking of various components into both larger and smaller molecules, and chemical interactions between these several products. The original carbonaceous coal and biomass are partially transformed into gas fuel products, liquid fuel products, tar fuel products, and solid fuel products. During the steam release portion of each steam cycle, expansion of the gas portions forces much of this gas, together with liquid and tar portions, out of the solid coke products, thus separating these volatile matter portions from the solid coke portions. During steam release the steam, together with these separated volatile matter portions, leaves the devolatilization reactor chamber, and the solid coke remains within the devolatilization chamber. The volatile matter leaving the devolatilization reactor chamber can be separated from the steam, and further separated into three separate volatile matter fuels; a gas volatile matter fuel; a liquid volatile matter fuel, and a tar volatile matter fuel. Two different separator systems for carrying out this separation, a barometric condenser with condensate tank system, and a steam centrifuge with surface condenser system, are described herein.

In the barometric condenser with condensate tank system steam and volatile matter portions, leaving the devolatilization reactor chamber during the steam release portion of each steam cycle, are discharged into the steam and cooling water mixing chamber of a barometric condenser. The steam and volatile matter are therein mixed directly with cooling water to condense the steam and all condensable portions of the volatile matter. Non condensable gas fuel portions of the volatile matter are pumped out of the top of the steam and cooling Water mixing chamber. Cooling water, steam condensate and liquid and tar portions of the volatile matter, are discharged from the bottom of the steam and cooling water mixing chamber into a condensate receiver tank vented to atmosphere.

In the condensate receiver tank gravity acts to float liquid volatile matter portions on top of the steam condensate and cooling water, and to sink heavy tar volatile matter to the bottom of the tank. These two volatile matter fuel products can be removed separately from the condensate receiver tank.

Alternatively two centrifuge separators can be used in series beyond the condensate receiver tank. The first centrifuge separates tar volatile matter of higher density than water from the cooling water and steam condensate. The second centrifuge separates cooling water and steam condensate from liquid volatile matter of lower density than water.

In the steam centrifuge and condenser system, steam and volatile matter, leaving the devolatilization reactor chamber during the steam release portion of each steam cycle, passes first through a steam centrifuge where heavy tar volatile matter fuel is separated. The remaining volatile matter portions and steam leave the steam centrifuge, and flow into the surface condenser where the steam and condensable volatile matter are condensed to liquids, and are transferred from the bottom of the surface condenser into a condensate receiver tank. Non condensable volatile matter fuel is pumped out of the top of the surface condenser. The liquid volatile matter fuel and steam condensate in the condensate receiver tank can be separated by the methods described hereinabove.

In these ways a separate coke fuel product and three separated volatile matter fuel products can be efficiently produced from carbonaceous fuels by use of the apparatus of this invention.

The ratio of volatile matter products to coke product can be adjusted over a moderate range, by adjusting the temperature of the superheated steam, by adjusting the pressure range of each steam cycle, and by processing mixtures of coal and biomass in adjustable proportions. The ratio of volatile matter product to coke product can be increased by using lower pressure steam with barometric condenser vacuum, and by using a larger fraction of biomass relative to coal since biomass fuels are much higher in volatile matter than coal.

The term carbonaceous fuels is used herein and in the claims to include carbon containing solid and semi-solid fuels, such as coal, lignite, peat, wood, farm harvest materials, seaweed, and other biomass fuels.

A. The FIG. 1 Form of the Invention

Figure 1:
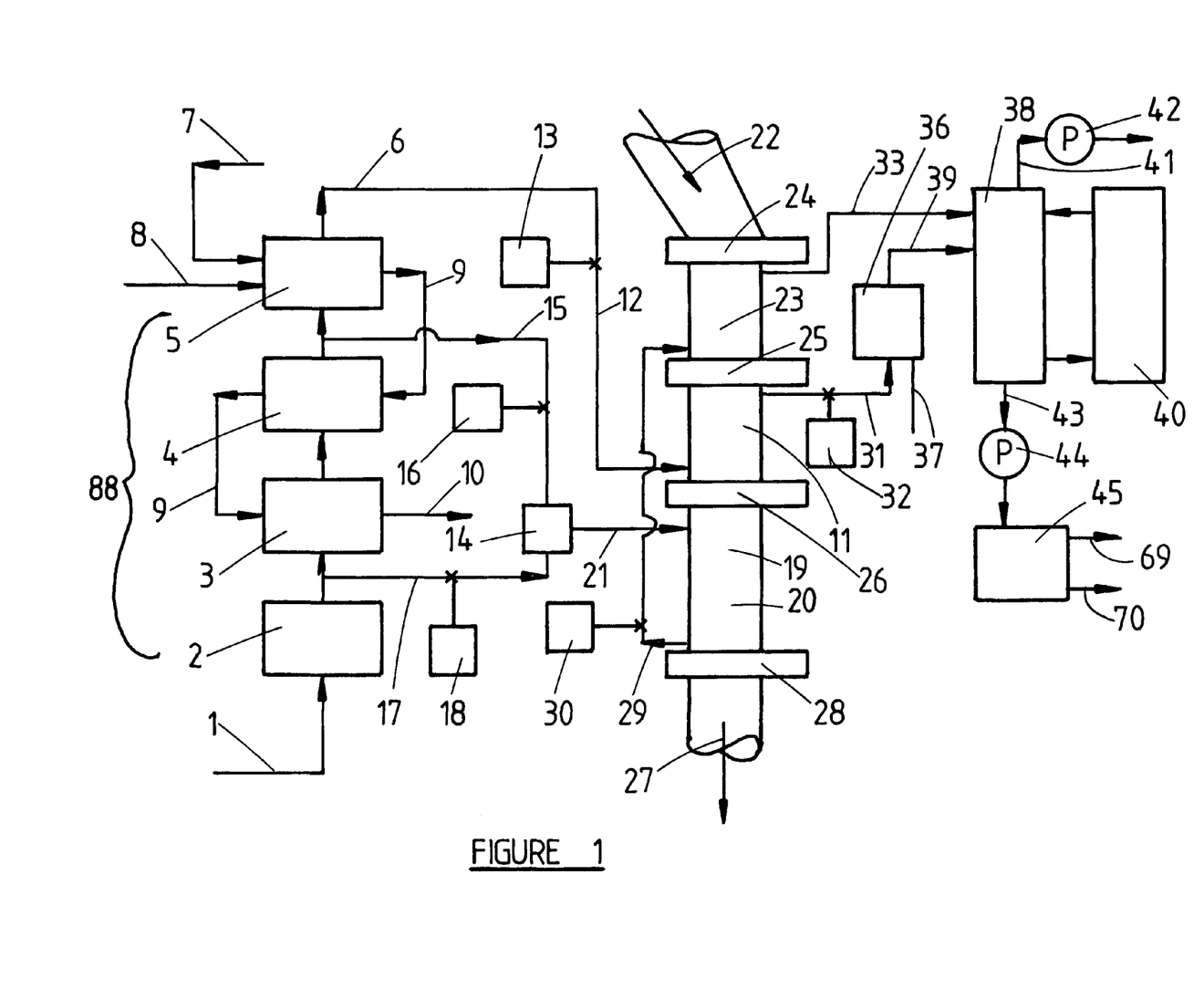

One particular example preferred form of the invention is shown schematically in FIG. 1 and comprises the following apparatus elements:

(a) A steam boiler (88) comprises a feedwater source (1), a feedwater pump (2), a feedwater heater(3), a steam boiler (4), a steam superheater (5), and a superheated steam outlet (6), a boiler fuel source (7), and boiler fuel burner air supply (8), boiler flue gas passages (9), and boiler flue gas outlet (10). This steam boiler supplies superheated steam to the devolatilization reactor chamber (11), via the superheated steam pipe (12), and steam inlet valve (13); steam leaves the devolatilization reactor chamber (11), via the steam outlet pipe (31), and steam outlet valve (32). This steam boiler also supplies saturated steam to the wet steam mixer chamber (14), via the saturated steam pipe (15), and saturated steam inlet valve (16). The steam boiler can also supply quench water, as from the feedwater heater (2), to the wet steam mixer chamber (14), via the quench water pipe (17), and quench water valve (18). The wet steam thusly created in the wet steam mixer chamber flows into the hot coke reactor end (19), of the coke quench chamber (20), via the wet steam inlet pipe (21). Reheated steam leaves the coke quench chamber (20), via the reheated steam transfer pipe (29), and reheated steam discharge valve (30), to flow into the coal preheat chamber (23), via the reheated steam transfer pipe (39), and, after flowing through the coal preheat chamber (23), to leave this chamber via the cooled steam discharge pipe (33).

(b) The apparatus for transferring the carbonaceous fuel chunks through three processing chambers in sequence, in order to carry out the devolatilization process, comprises the following elements: carbonaceous fuel chunks from a primary source (22), are periodically transferred in batches into the coal preheat chamber (23), by the sealable primary fuel transfer mechanism (24); and are periodically transferred in batches out of the coal preheat chamber and into the devolatilization reactor chamber pressure vessel (11), by the sealable refuel transfer mechanism (25); devolatilized hot coke batches are transferred periodically out of the devolatilization reactor chamber (11), and into the coke quench chamber (20), by the sealable hot coke transfer mechanism (26); and quenched coke batches are periodically transferred from the coke quench chamber (20), into a receiver of quenched coke (27), via the sealable quenched coke transfer mechanism (28).

(c) A carbonaceous fuel control and actuator is operative upon the four fuel transfer mechanisms (24), (25), (26), (28), so that the following sequence of transfers of fuel batches takes place at the end of each refuel time interval: a quenched coke batch is transferred out of the coke quench chamber (20); a hot coke batch is next transferred out of the devolatilization reactor chamber (11); a preheated coal batch is next transferred out of the coal preheat chamber (23); a primary coal batch is next transferred out of the primary fuel source (22). These control and actuator operations can be carried out by hand, or preferably automatically. In this way each carbonaceous fuel batch passes in steps first through the coal preheat chamber, then through the devolatilization reactor chamber, and then through the coke quench chamber. Each carbonaceous fuel batch remains inside each of these chambers a number of refuel time intervals essentially equal to the number of fuel batches contained within each chamber.

(d) A steam cycle control and actuator is operative upon the several steam inlet valves (13), (16), (18), and steam outlet valves (30), (32), so that, during each refuel time interval an integral number of steam cycles are applied to the carbonaceous fuel batches within the devolatilization reactor chamber (11), and also so that, during each refuel time interval another integral number of wet steam cycles are applied to the devolatilized coke batches within the coke quench chamber (20). Each steam cycle comprises the steps of; compressing superheated steam into the devolatilization reactor chamber (11), by closing the steam outlet valve (32), and opening the steam inlet valve (13); followed after a compression cycle time interval by steam release from the devolatilization reactor chamber (11), by closing the steam inlet valve (13), and opening the steam outlet valve (32). As shown on FIG. 3, during each steam cycle the steam is first compressed into the interchunk spaces (34), between carbonaceous fuel chunks, and also into the pore spaces within each carbonaceous fuel chunk (35). Direct contact heat transfer takes place, from the steam, into the coal chunks, through the large interchunk and pore interior areas, and increases the temperature of the carbonaceous fuel chunks. Subsequently, during steam release, the steam flows out of the pore spaces and through the interchunk spaces, and direct contact throughflow heat transfer occurs. In this way, after several such steam cycles, the carbonaceous fuel can reach temperatures sufficiently high to cause rapid occurrence of the complex devolatilization process. This complex devolatilization process includes: vaporization of lower molecular weight volatile matter; melting of medium molecular weight volatile matter; thermal cracking of a wide range of molecular weight volatile matter, including otherwise solid molecules, into lower molecular weight volatile matter; and reactions between these various molecules leading to the formation of higher molecular weight molecules, come of which become solid coke. In this way, portions of the original coal or biomass become gases, other portions become liquids, other portions become tars, and some portions become coke added to the original coke portions.

During steam release the several gas volatile matter products, created by these devolatilization reactions, expand and force tars and liquids out of the carbonaceous fuel chunks to mix into the steam, and leave the devolatilization reactor chamber with the departing steam, leaving a devolatilized solid coke product behind in the devolatilization reactor chamber.

(e) One of the principal beneficial objects of this invention is to increase the rate of heat transfer from steam to coal, by use of cyclic compression of steam into coal pore spaces and interchunk spaces, followed by release of steam and volatile matter out of these spaces. Additionally, heat is transferred almost uniformly into each coal chunk, with reduced thermal expansion stresses, and a resulting mechanically stronger coke. In this way volatile matter portions of coal and biomass can be rapidly separated into several volatile matter fuel products and a solid coke fuel product.

(f) Steam and volatile matter, discharged from the devolatilization reactor chamber (11), during each steam release step of each steam cycle, is transferred into the steam centrifuge separator (36), via the steam outlet pipe (31), and steam outlet valve (32). Heavy tar volatile matter is separated from the steam and low density volatile matter flowing into the steam centrifuge separator (36), and is discharged via the pipe (37), as a separated tar volatile matter fuel product. Details of the steam centrifuge separator (36), and its operation are illustrated schematically in FIG. 2 and described hereinbelow. The remaining low density volatile matter and steam flow out of the steam centrifuge separator (36), and into the steam condenser separator (38), via the pipe (39). Steam and condensable volatile matter are condensed to liquids in the shell side of the condenser (38), being cooled by cooling water from a cooling water source (40), on the tube side of the condenser (38). Non condensable volatile matter fuel gas is separated and pumped out of the top of the shell side of the condenser via the pipe (41), and condenser vacuum pump (42), as a gas volatile matter fuel product. Condensable liquid volatile matter and condensed steam are pumped out of the bottom of the shell side of the condenser via the pipe (43), and condensate pump (44), into the condensate separator tank (45). Details of the steam condenser (38), and its operation are illustrated schematically in FIG. 5 and described hereinbelow. In the condensate separator tank (45), insoluble condensable volatile matter, being of lower density than steam condensate, floats on top of the steam condensate and can be removed separately via the condensable volatile matter pipe (69), as a liquid volatile matter fuel product. The steam condensate is removed from the bottom of the condensate separator tank (45), via the pipe (70). A centrifuge separator can alternatively be used, instead of the condensate receiver tank, to separate the liquid volatile matter fuel product from the steam condensate.

(g) A principal beneficial object of this invention is the separation from coal and biomass, of a liquid volatile matter fuel, and a separate tar volatile matter fuel, both of which can be used in internal combustion engines for transportation applications. These liquid volatile matter fuels can be used efficiently in conventional internal combustion engines of small or medium bore. These tar volatile matter fuels can be efficiently used in large bore marine diesel engines. Additionally these tar volatile matter fuels can be efficiently used in small and medium bore diesel engines, equipped with supplementary fuel atomizing systems for use with slurry fuels, as described hereinbelow. The gas volatile matter fuel removed from the top of the condenser can be used as boiler fuel, such as in the steam boiler supplying superheated steam into the devolatilization reactor chamber.

(h) In the coke quench chamber (20), a separate integral number of wet steam cycles are applied to the devolatilized coke batches within the coke quench chamber (20), during each refuel time interval. Each wet steam cycle comprises a compression step, with the reheated steam discharge valve (30), closed, and the saturated steam inlet valve (16), and quench water valve (18), both open, during which wet steam is compressed into the interchunk spaces and coke chunk pore spaces in the coke quench chamber. After a wet steam cycle time interval, each wet steam cycle is ended with a wet steam release step, with the saturated steam inlet valve (16), and quench water valve (18), both closed, and the reheated steam discharge valve (30) open, during which reheated steam flows out of the coke quench chamber (20), and into the coal preheat chamber (23), via the reheated steam inlet pipe (29). After passing through the coal preheat chamber, the cooled steam is discharged into the condenser (38), via the cooled steam discharge pipe (33). The steam cycle control and actuator is additionally operative upon these wet steam valves (16), (18), and reheated steam valve (30), to carry out a different integral number of wet steam cycles, as described above, during each refuel time interval. These control operations can be carried out by hand or preferably automatically.

During each wet steam cycle, the temperature of the very hot devolatilized coke chunks, in the coke quench chamber is rapidly reduced, in large part by evaporative cooling by evaporation of the water portion of the wet steam. Additionally, the carbonaceous fuel chunks, in the coal preheat chamber, can be sufficiently preheated that steam condensation will not occur during early steam cycles in the devolatilization reactor chamber. In this way pore spaces in the carbonaceous fuel chunks are not blocked by steam condensate, and are fully available to receive the superheated steam during the compression step of each steam cycle.

B. Carbonaceous Fuel Transfer Mechanism

The several carbonaceous fuel transfer mechanisms (24), (25), (26), (28), function to sealably transfer carbonaceous fuels from one chamber to the next. Various types of transfer mechanisms can be used for this purpose, such as are described in U.S. Pat. No. 5,485,812, Firey, 1996, and U.S. Pat. No. 4,653,436, Firey, 1987, and these descriptions are incorporated herein by reference thereto. Lock hopper valves can alternatively be used as carbonaceous fuel transfer mechanisms, such as are described in the following references:

*Fuel Gasification,* American Chemical Society, 1967, FIG. 1, p. 33

Figure 3:
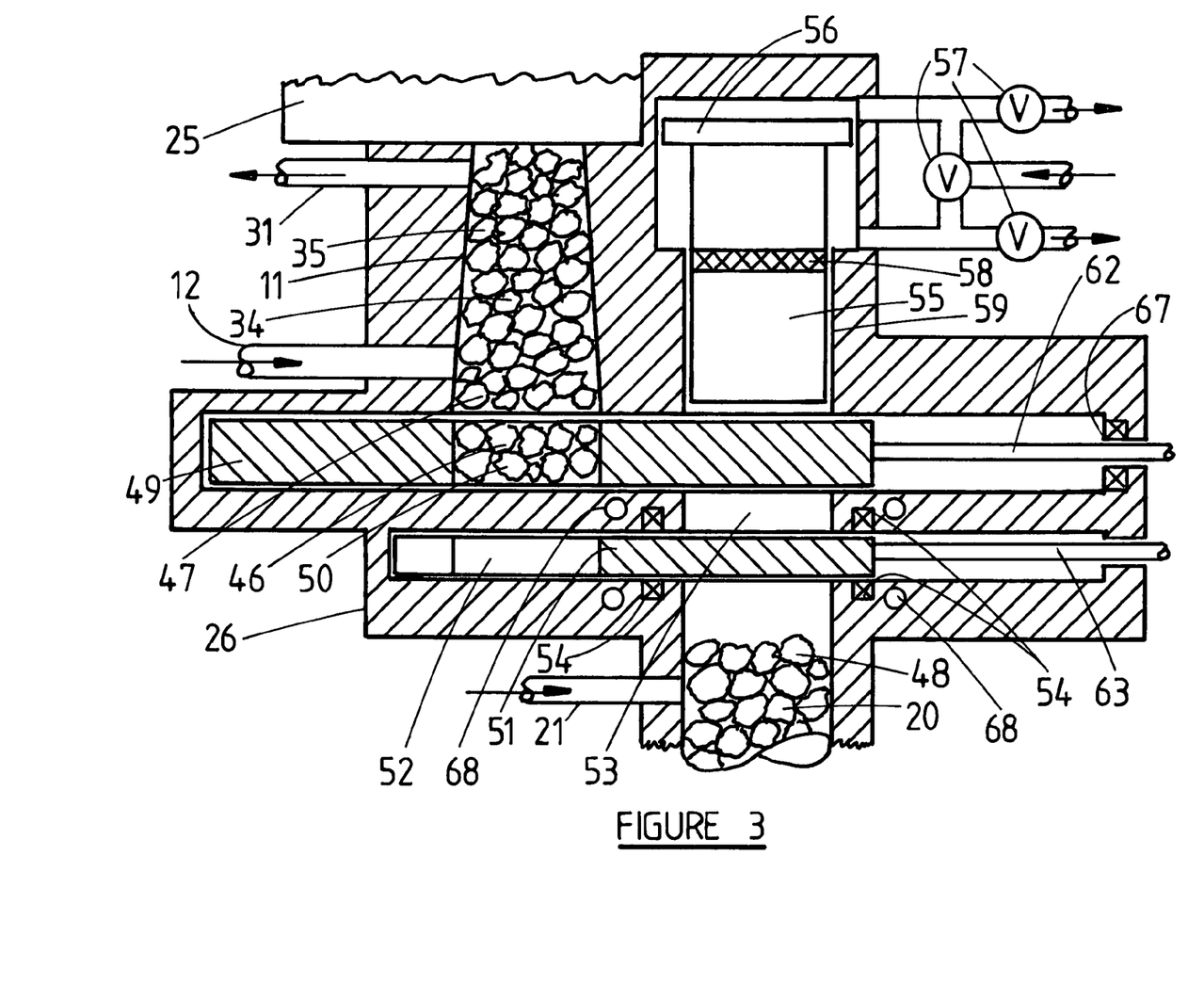
Figure 4:
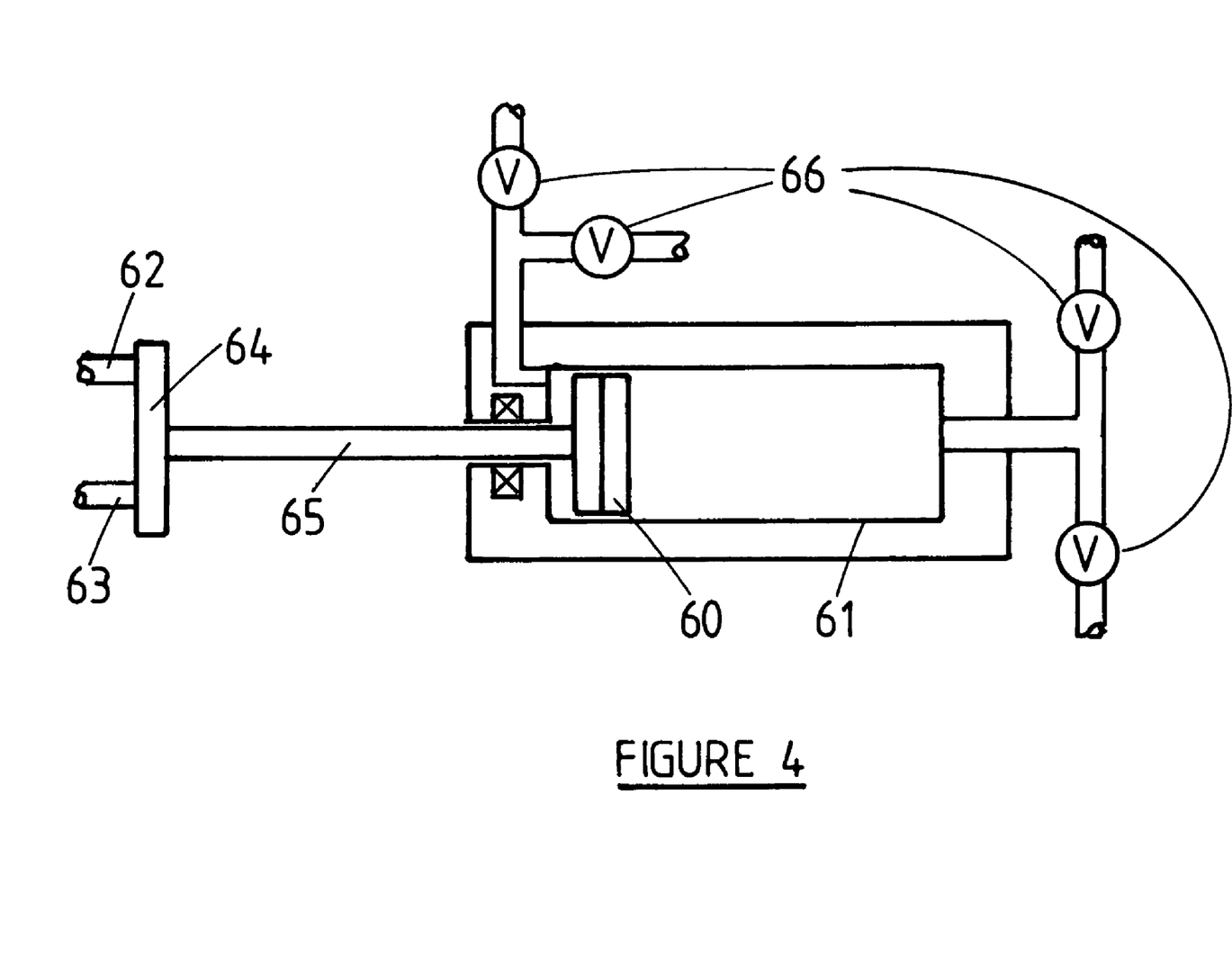

*Gas Engines and Producers,* L. Marks and H. McDewell, American Technical Society, 1919, FIG. 8, page 18 of section 2;

One particular example carbonaceous fuel transfer means is illustrated in schematic cross section in FIG. 3 and FIG. 4, as used for the sealable coke removal mechanism (26), to positively transfer a hot devolatilized coke batch of chunks (46), from the coke removal end (47), of the devolatilization reactor chamber (11), into the hot coke receiver end (48), of the coke quench chamber (20), at the end of each refuel time interval. The transfer plate (49), is shown in FIG. 3 with the batch cavity (50), aligned to receive a batch (46), of devolatilized coke chunks from the coke removal end (47), of the devolatilization reactor chamber (11). The seal plate (51), is shown in FIG. 3 with the transfer recess (52), non aligned to the transfer passage (53), and sealing the devolatilization reactor chamber (11), from the coke quench chamber (20), via the sliding seals (54). The positive transfer piston (55), can be driven and retracted by applying hydraulic or pneumatic fluid pressure to the transfer drive piston (56), via the pressure and release valves (57). The transfer piston seals (58), prevent leakage between the transfer piston (55), and transfer cylinder (59). The transfer plate (49) and seal plate (51), can be concurrently moved to align both the batch cavity (50). and the transfer recess (52), with the transfer passage (53), and the transfer piston (55), when a batch of devolatilized coke chunks (46), is to be transferred into the coke quench chamber (20), at the end of a refuel time interval. The actuator piston (60), and cylinder (61), shown in FIG. 4 thusly concurrently moves the transfer plate (49), and seal plate (51), via the bars (62), (63), common link (64), and actuator piston rod (65). Thusly aligned, the transfer drive piston (56), drives the transfer piston (55), through the batch cavity (50), and transfer recess (52), to deliver the batch (46), of devolatilized coke chunks into the coke quench chamber (20). The actuator piston (60), can be driven and retracted by applying hydraulic or pneumatic fluid pressure to the actuator piston (60), via the pressure and release valves (66). The transfer plate (49), actuator bar (62), is sealed (67). The transfer plate (49), and the seal plate (51), can be returned to the position shown in FIG. 3 by a reverse action of the actuator piston (60), whereupon the batch cavity (50), will be refilled with another batch of devolatilized coke chunks, forced out of the devolatilization reactor chamber by gravity, or by the positive transfer piston of the refuel transfer mechanism (25). For this hot coke removal mechanism (26), seal cooling passages (68), may be used to keep the seals (54), adequately cool, by passing reheated steam leaving the coke quench chamber (20), through these cooling passages. The positive transfer of carbonaceous fuel batches illustrated on FIG. 3, may be preferred, where free swelling coals are being devolatilized, to assure batch transfer even when the coke chunks have clinkered together.

C. Steam Centrifuge and Condenser

Figure 2:
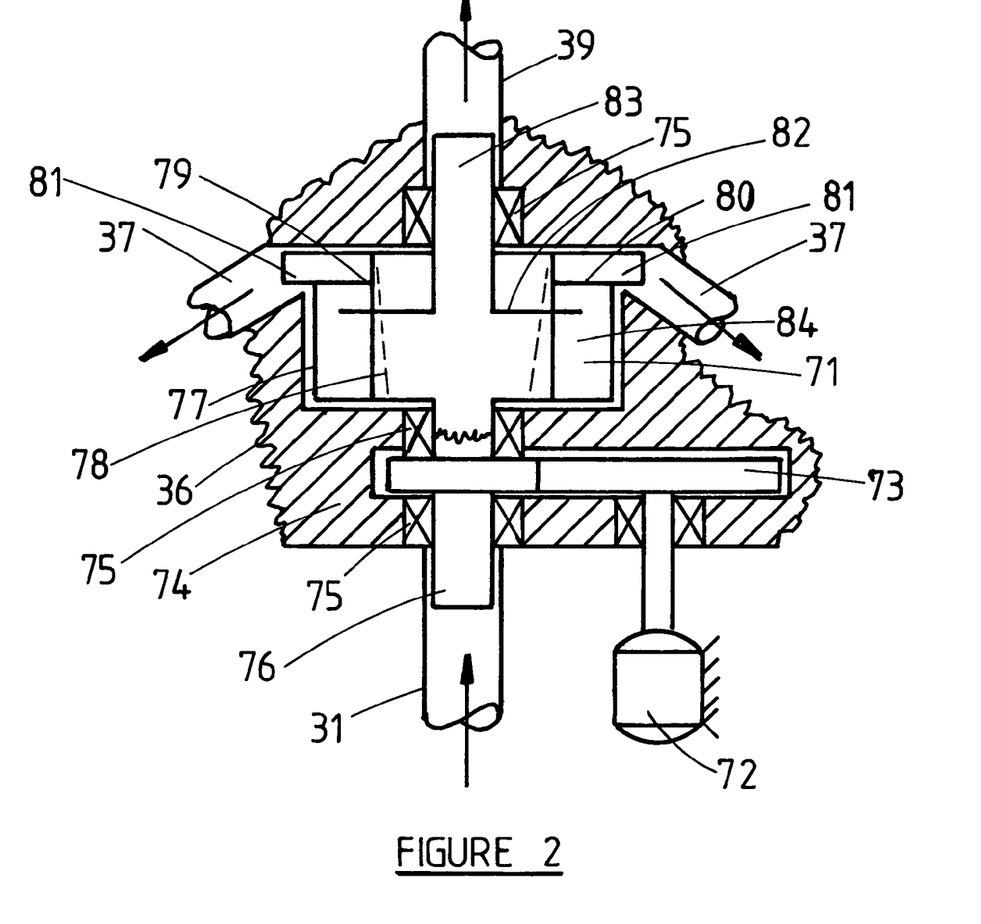

An example steam centrifuge (36), is illustrated schematically in cross section in FIG. 2. The centrifuge bowl (71), is rotated at high speed by the drive motor (72), and gears (73), and is supported within the centrifuge enclosure (74), by the several sealed bearings (75). Steam and volatile matter from the devolatilization reactor chamber (11), enters the centrifuge bowl via pipe (31), and hollow bowl lower shaft (76). Within the centrifuge bowl (71), centrifugal force pushes heavy volatile matter tars to the outer bowl radius (77), where they accumulate until this tar layer depth (78), reaches the inner radius (79), of the spill plate (80). Radial guide vanes (84), can be used to assist in bringing tar angular velocity up to bowl angular velocity. Thereafter volatile matter tars are thrown out of the centrifuge bowl (71), via the exit nozzles (81), and into the tar discharge pipe (37), where they are removed as a tar volatile matter fuel product. The mask plate (82), prevents flow of steam and remaining non tar volatile matter portions from leaving the centrifuge bowl (71), via the tar discharge pipe (37). Steam and non tar volatile matter leave the centrifuge bowl (71), and flow into the condenser (38), via the hollow bowl upper shaft (83), and pipe (39).

Figure 5:
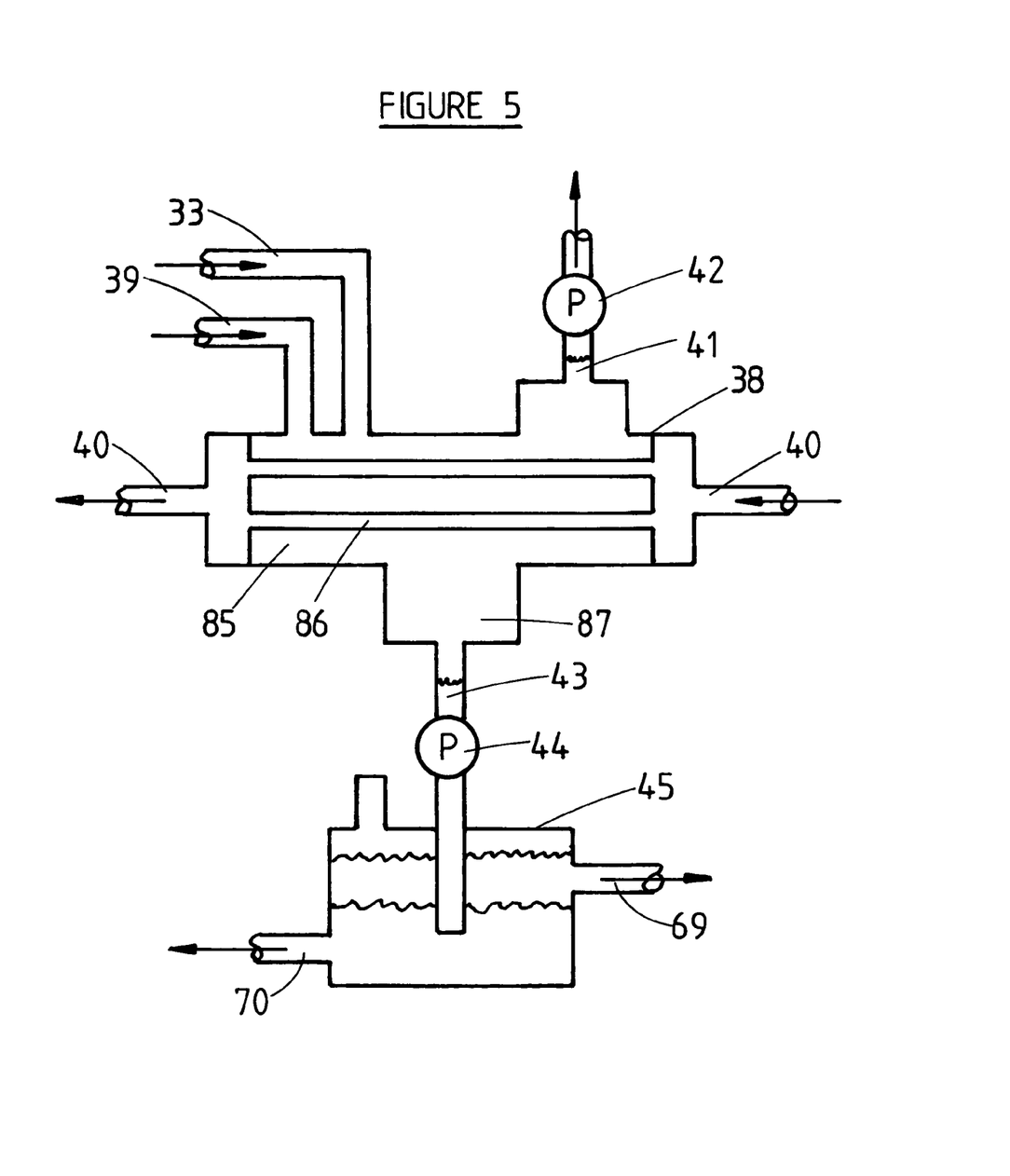

An example surface steam condenser (38), is illustrated schematically in cross section in FIG. 5. Steam and non tar volatile matter, from the steam centrifuge discharge pipe (39), flows into the shell side (85), of the shell and tube steam condenser (38). Cooling water from a cooling water source (40), flows through the steam condenser tubes (86), to cool and condense the steam and non tar volatile matter. Non condensable gas volatile matter is pumped, by the vacuum pump (42), via pipe (41), from the top of the shell side (85) of the condenser, and delivered as a gas volatile matter product. Steam condensate and condensable volatile matter collect in the condenser hot well (87), and are pumped therefrom by the condensate pump (44), into the vented condensate separator tank (45).

As described hereinabove a liquid volatile matter fuel product is removed via pipe (69), and steam condensate is removed via pipe (70), from the condensate separator tank (45).

D. The FIG. 6 Form of the Invention

Figure 6:
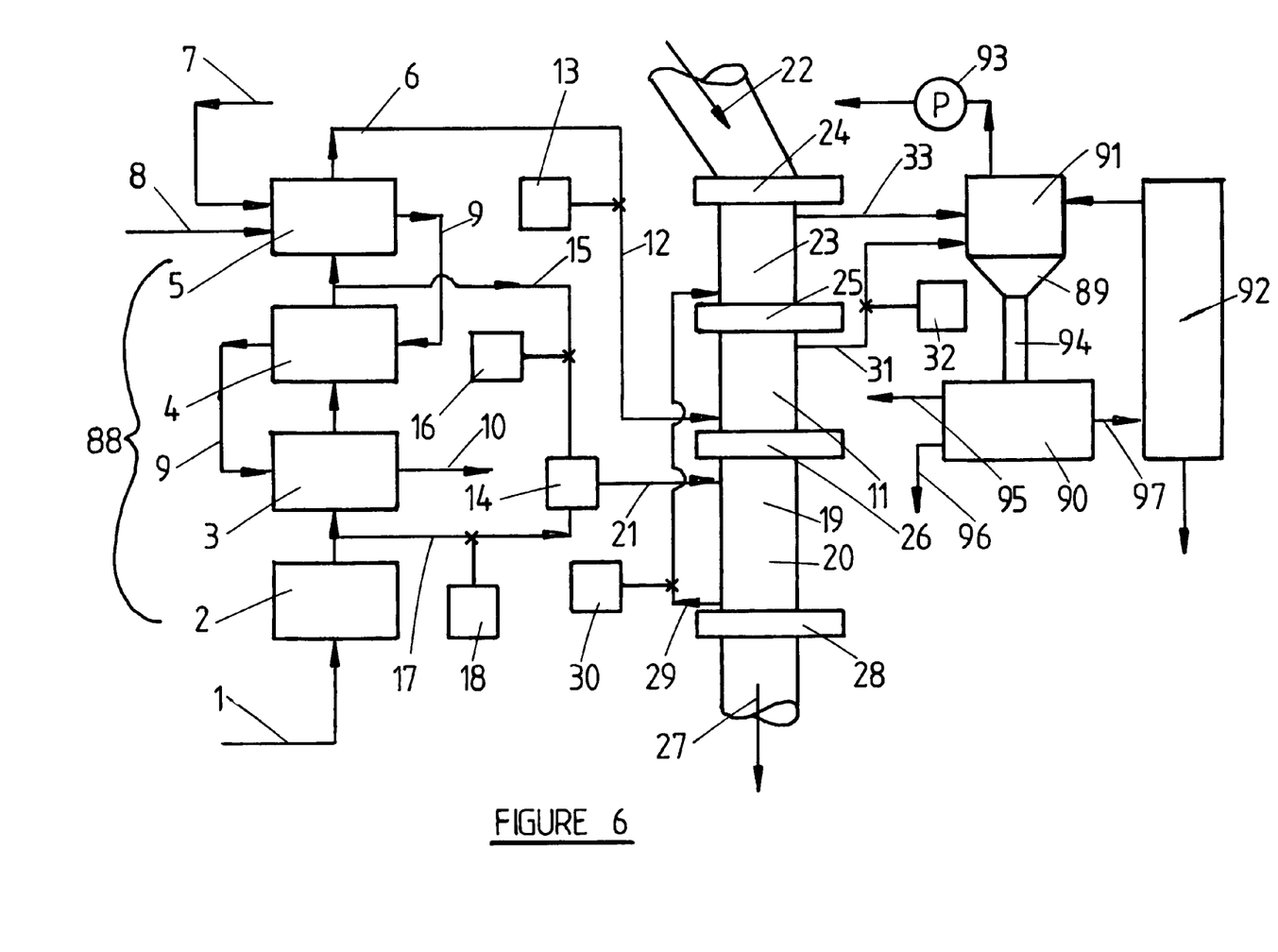

Another particular example form of the invention is shown schematically in FIG. 6, and comprises the following apparatus elements, which are similar to these elements as shown on the FIG. 1 form of the invention:

(a) A steam boiler (88)
(b) A devolatilization reactor chamber (11)
(c) A coke quench chamber (20)
(d) A coal preheat chamber (23)
(e) Four carbonaceous fuel transfer mechanisms (24), (25), (26), (28)
(f) Three steam valves (13), (16), (30)
(g) A saturated steam valve (16), and water valve (18), connecting into a steam water mixer (14)
(h) A source of carbonaceous fuel chunks (22), and a receiver of devolatilized coke chunks (27)

These elements are connected together and operate as described hereinabove for the FIG. 1 form of the invention.

(i) The FIG. 6 form of the invention further comprises a barometric condenser (89), and condensate receiver tank (90), as the combined volatile matter separator means, in place of the steam centrifuge (36), and surface condenser (38), used as the volatile matter separator means in the FIG. 1 form of the invention.

Steam and volatile matter, discharged from the devolatilization reactor chamber during each steam release step of each steam cycle, is transferred into the steam and cooling water mixing chamber (91), of the barometric condenser (89), via the steam outlet pipe (31), and steam outlet valve (32). Cooling water from a source (92), flows continuously into the steam and cooling water mixing chamber (91), via spray nozzles aligned to mix cooling water with the entering steam and volatile matter, in order to condense the steam and condensable portions of the volatile matter. Non condensable gas fuel portions of the volatile matter are removed from the top of the steam and cooling water mixer chamber (91), via the gas transfer pump (93). The remaining liquid and tar volatile matter portions, together with the cooling water and steam condensate, leave the bottom of the steam and cooling water mixer chamber (91), via the barometric condenser discharge pipe (94), and transfer into the condensate receiver tank (90).

An adequate vacuum can be created within the steam and cooling water mixer chamber (91), and hence also within the devolatilization reactor chamber (11), during the steam release portion of each steam cycle, by using a barometric condenser discharge pipe (94), of about thirty-four feet length above the fluid level in the condensate receiver tank (90). Operating the devolatilization reactor chamber at such vacuum pressures, during the release portion of each steam cycle, increases the ratio of volatile matter product over solid coke product.

(j) Within an adequately large condensate receiver tank the various fluids can be sufficiently quiescent that gravity can act to separate the water insoluble volatile matter materials from the cooling water and steam condensate, as well as from each other. Volatile matter liquids of lower density than water, will float to the top of the condensate receiver tank, and can be removed via the volatile matter liquids removal pipe (95). Volatile matter tars of greater density than water will sink to the bottom of the condensate receiver tank, and can be removed via the volatile matter tar removal pipe (96). Cooling water and steam condensate can be removed from between the two separated volatile matter layers, via the cooling water return pipe (97), and returned to the source of cooling water (92), via the cooling water return pipe (97).

E. The Barometric Condenser and Condensate Receiver

Figure 7:
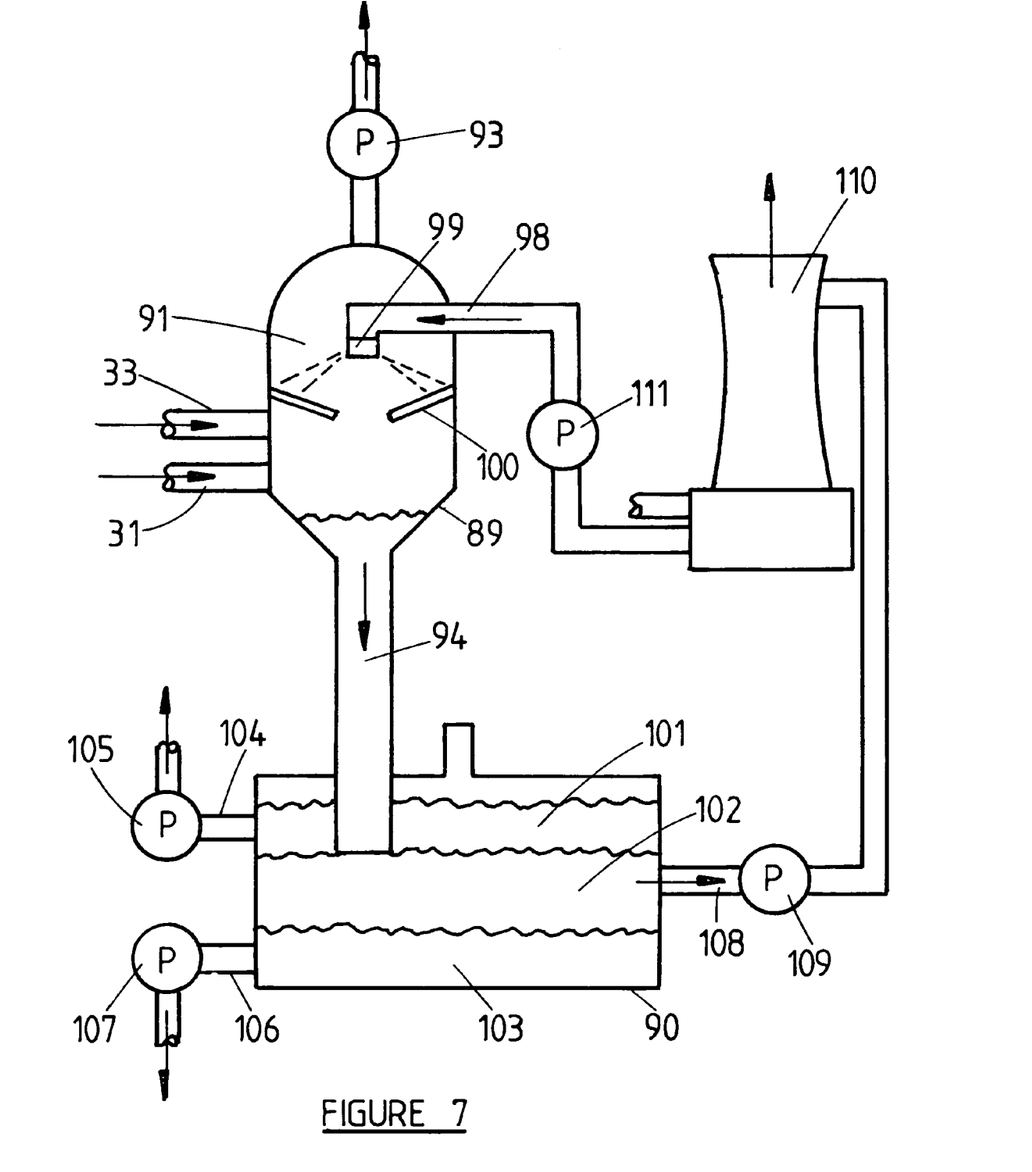

An example barometric condenser (89), and condensate receiver (90), is shown in schematic cross section in FIG. 7. Steam and volatile matter from the devolatilization reactor chamber (11), and the coal preheat chamber (23), enters the steam and cooling water mixing chamber (91), via the pipes (31), (33), respectively, and is mixed with cooling water, entering the steam and cooling water mixing chamber (91), via pipe (98), and cooling water spray nozzles (99). The cooling water spray nozzles, and one or more distribution trays (100), assure full mixing of steam and cooling water and condensation of all entering steam and condensable volatile matter. Non condensable gas volatile matter fuels rise to the top of the steam and cooling water mixer chamber, and are removed therefrom by the vacuum pump (93), for a fuel use elsewhere. The condensed volatile matter and tars, together with the cooling water and steam condensate, leave the steam and cooling water mixer chamber (91) via the barometric condenser discharge pipe (94), and flow into the condensate receiver tank (90). A barometric condenser discharge pipe vertical length of at least thirty-four feet above the water level in the condensate receiver tank (90), assures a vacuum will exist in the steam and cooling water mixer chamber (91), as also in the devolatilization reactor chamber (11), at the end of the steam release step of each steam cycle. By thus evacuating the devolatilization reactor chamber, and the interchunk spaces and chunk pore spaces therein, the maximum superheated steam quantity can then be compressed into these spaces during the next following compression step of each steam cycle. In this way the required integral number of steam cycles, during each refuel interval, can be minimized, and a more efficient steam utilization is obtained.

As described hereinabove, within the condensate receiver tank (90), gravity acts to separate the volatile matter from the cooling water and steam condensate, with a liquid volatile matter layer (101), floating on top of a water layer (102), and a tar layer (103), beneath the water layer. Liquid volatile matter can be pumped from the top layer (101), via pipe (104), and pump (105). Tar volatile matter can be pumped from the bottom layer (103), via pipe (106), and pump (107). Cooling water and steam condensate can be pumped from the middle layer (102), via pipe (108), and pump (109). Cooling water and steam condensate can be delivered into the top of an atmospheric cooling tower (110), where evaporative cooling reduces the cooling water temperature sufficiently for reuse and recirculation through the barometric condenser (89), via pump (111), and pipe (98). Other sources of cooling water can be used such as rivers and cooling ponds.

As shown in FIG. 7, the liquid volatile matter and the tar volatile matter are separated from each other, and from the cooling water and steam condensate, by the force of gravity acting on the density differences between these fluids. Centrifuge separators can alternatively be used to carry out this separation, and apply larger separating forces.

In this way, the volatile matter, removed from the primary carbonaceous fuel chunks, is further separated into three separate fuel products: a gas volatile matter fuel, a liquid volatile matter fuel, and a tar volatile matter fuel. The gas volatile matter fuel can be used as fuel in steam boilers, such as the steam boiler supplying steam into the devolatilization reactor chamber. Both the liquid volatile matter fuel, and the tar volatile matter fuel, can be used as fuel in piston internal combustion engines for transportation uses. This is one of the principal beneficial objects of this invention, to efficiently utilize the volatile matter portion, of our very large domestic coal resource, as fuel for our critical transportation needs.

F. Steam Boiler Options

When used in combination with a high pressure steam boiler for electric power generation, a separate low pressure steam boiler may frequently be preferred for use on the coal devolatilization apparatus of this invention. High pressure steam boilers require boiler feedwater remarkably free of undesirable impurities, and feedwater recovery of steam condensate is essential. Such recovery of boiler steam condensate, free of impurities, would be very difficult in a coal devolatilization apparatus of this invention, since the steam used for devolatilization is closely mixed with coal and volatile matter. Where steam condensate recovery is not needed, various types of low or moderate pressure steam boilers can be adapted for use with the coal devolatilization apparatus of this invention.

G. Industrial Uses of the Invention

The principle use of coal, mined in the United States, is in conventional steam power plants for electric power generation, where the coal is fired directly into steam boiler furnaces. These plants could realize an economic gain by first using this invention to separate the volatile matter from the coal, as a premium priced product, for use in internal combustion engines fitted for usage of slurry fuels. The devolatilized coke could then be fired directly into the steam boiler furnace, without the need for coke quenching. The cost of the required additional coal would be more than offset by the premium price obtained from sale of the separated volatile matter to engine users.

Combined cycle electric power plants currently use expensive natural gas as fuel into the gas turbine engine. Modified combined cycle electric power plants could be fueled entirely by low cost coal by use of the apparatus of this invention. The steam and volatile matter, separated from the coke in the devolatilization reactor chamber could be fired into the gas turbine cycle. The hot gas turbine exhaust, plus the devolatilized coke fuel, could be fired into the steam cycle. Unit energy costs of fuels vary but, per unit of fuel energy, natural gas is usually about five to ten times more costly than coal. The ratio of fuel energy into the gas turbine cycle, to fuel energy into the steam cycle, can be increased by blending non food farm harvest biomass with the coal, and sending this blend through this invention, in order to increase the ratio of volatile matter fuel to coke fuel. Biomass fuels typically have volatile matter content of seventy to eighty percent by weight.

A principal beneficial object of this invention is to provide a method to replace expensive petroleum distillate fuels, with fuels derived from low cost coal and non food farm harvest biomass, for use in internal combustion engines for our critical surface transportation industries. A modified diesel engine fuel system is described in the following references, which permits use of very high viscosity fuels, such as volatile matter tars, to be efficiently used in medium and small bore diesel engines:

Supplementary Slurry Fuel Atomizer and Supply System, U.S. Pat. No. 7,281,500, Firey, 2007

Common Rail Supplementary Atomizer for Piston Engines, U.S. Pat. No. 7,418,927, Firey, 2008

Rotary Residual Fuel Slurrifier, Firey, U.S. patent application published on internet, US-2008-0172934-A1

Modified Common Rail Fuel Injection System, Firey, US patent application, to be published on internet, Jul. 30, 2009

High viscosity fuels are adequately preatomized, outside the engine, into a fuel in water slurry fuel, also containing other components, such as slurry stabilizers and ignition aids. These references are incorporated herein by reference thereto.

Fuel costs vary, but the unit energy cost of petroleum is usually about five- to tenfold greater than the unit energy cost of coal.

The fuel energy content of known U.S. coal reserves is very large, and about ten times the fuel energy content of known worldwide petroleum reserves. National energy independence, needed for a sound national defense capability, can be achieved by adopting coal fuels for efficient use in our critical surface transport industries, such as the following:

Railroad locomotive diesel engines
Tug and barge diesel engines
Open cast mine shovels, trucks and draglines
Cargo ships
Farm tractor and harvester diesel engines
Long haul highway trucks A high yield of renewable engine fuel, usable in modified diesel engines, can be obtained from non food farm harvest biomass by use of the apparatus of this invention. Farm harvest biomass typically contains seventy-to-eighty percent volatile matter by weight. These volatile matter fuel yields are appreciably greater than from current biodiesel and ethanol fuel processes, and do not use the food portion of the farm harvest.

Having thus described my invention, what I claim is:

1. Apparatus for separating carbonaceous fuels, such as coal and biomass, into two or more separated fuel products, a devolatilized coke product, and one or more volatile matter products, said apparatus comprising:

a source of carbonaceous fuel chunks containing volatile matter;

a steam boiler source of superheated steam at a steam boiler pressure;

a receiver of devolatilized coke chunks;

a receiver of steam and volatile matter at a receiver pressure less than said steam supply pressure;

a sealable, and preferably insulated, pressure vessel devolatilization reactor chamber comprising a refuel end and a coke removal end, and further comprising:

refuel transfer means for intermittently, and sealably, transferring a single refuel batch of carbonaceous fuel chunks, from said source of carbonaceous fuel chunks, into said refuel end of said devolatilization reactor chamber;

coke removal transfer means for intermittently and sealably transferring, a single batch of devolatilized coke chunks, from said coke removal end of said devolatilization chamber, into said receiver of devolatilized coke chunks;

a steam inlet pipe with steam inlet valve for transferring superheated steam, from said source of superheated steam, into said coke removal end of said devolatilization reactor chamber, at steam boiler pressure;

a steam outlet pipe with steam outlet valve for transferring steam and volatile matter, from said refuel end of said devolatilization reactor chamber, into said receiver of steam and volatile matter, at receiver pressure;

carbonaceous fuel control and actuator means for operating said refuel transfer means, and said coke removal transfer means, intermittently at refuel time intervals, so that said devolatilization reactor chamber is maintained essentially filled with a number of batches of carbonaceous fuel chunks; and further so that, at the end of each refuel time interval, a single batch of devolatilized coke fuel chunks is transferred from the coke removal end of said devolatilization reactor chamber into said receiver of devolatilized coke chunks, by said coke removal transfer means, and so that a single batch of carbonaceous fuel chunks is next transferred, from said source of carbonaceous fuel chunks, into the refuel end of said devolatilization reactor chamber, by said refuel transfer means, to start the next following refuel time interval;

whereby each carbonaceous fuel batch moves, in steps, from the refuel end of said devolatilization reactor chamber, toward the coke removal end of said devolatilization reactor chamber, each step taking place at the end of each refuel time interval, and each carbonaceous fuel batch reaching the coke removal end of said devolatilization reactor chamber after a number of refuel time intervals, following entry, essentially equal to the number of carbonaceous fuel batches inside said devolatilization reactor chamber, and each carbonaceous fuel batch is removed from said devolatilization reactor chamber, at the end of the next refuel time interval after reaching said coke removal end, and is transferred into said receiver of devolatilized coke chunks;

steam control and actuator means for opening and closing said steam inlet valve, and said steam outlet valve, intermittently at steam cycle time intervals, so that an integral number of steam cycles, of steam compression into said devolatilization reactor chamber, followed, after a compression time interval, by steam release from said devolatilization reactor chamber, takes place during each refuel time interval, each said steam cycle comprising the following sequence of steps:

the steam outlet valve is closed;

the steam inlet valve is opened to admit superheated steam, from said steam boiler source, into said devolatilization reactor chamber at steam boiler pressure;

after a compression cycle time interval the steam inlet valve is closed;

the steam outlet valve is opened to discharge steam and volatile matter out of the devolatilization reactor chamber into said receiver of steam and volatile matter at receiver pressure;

whereby, by thus operating the devolatilization reactor chamber over a range of steam pressure, during each steam cycle, the steam is compressed into the interchunk spaces and pore spaces of the carbonaceous fuel chunks, during each steam compression, and heat is transferred rapidly into said carbonaceous fuel chunks, by direct contact, over pore and inter chunk area, between steam and carbonaceous fuel chunks, to increase the temperature thereof; as carbonaceous fuel temperature is thusly increased the volatile matter portions become vaporized and liquefied and thermally cracked, and are forced out of the carbonaceous fuel chunks by such vaporization, and are mixed into the steam, thus creating additional pore spaces in the carbonaceous fuel chunks;

and further whereby the volatile matter, forced out of the carbonaceous fuel chunks and mixed into the steam, is discharged into said receiver of steam and volatile matter during the steam release portion of each steam cycle, and is thus separated from the devolatilized coke portions;

and further whereby additional volatile matter is thusly separated from carbonaceous fuel chunks during each of the several steam cycles, taking place during each refuel time interval, of all the number of refuel time intervals experienced by each refuel batch of carbonaceous fuel, while inside said devolatilization reactor chamber;

and finally whereby the devolatilized coke product in each carbonaceous fuel batch, thus largely separated from its volatile matter product, is delivered into said receiver of devolatilized coke chunks by said coke removal transfer means.

2. Apparatus for separating carbonaceous fuels, such as coal and biomass; into two or more separated fuel products, a devolatilized coke product, and one or more volatile matter products, as described in claim 1:

wherein said receiver of steam and volatile matter comprises, a steam centrifuge separator means, a steam condenser separator means, and a condensate separator means;

and further comprising, a receiver of tar volatile matter, a receiver of non condensable gas volatile matter, a receiver of condensable volatile matter, a receiver of steam condensate, and a source of condenser cooling water;

said steam centrifuge separator means being connected to receive steam and volatile matter, from said refuel end of said devolatilization reactor chamber, during each release step of each steam cycle, and to discharge steam and volatile matter into said steam condenser separator means;

said steam centrifuge separator means being operative to apply centrifugal force to separate high density tar volatile matter from steam and low density volatile matter and to discharge high density tar volatile matter into said receiver of tar volatile matter and to discharge steam and low density volatile matter into said steam condenser separator means;

said steam condenser separator means being a surface condenser, and being operative, to receive steam and low density volatile matter from said steam centrifuge means on one side of said surface, and to receive cooling water from said source of condenser cooling water on the opposite side of said surface, and to discharge steam condensate and condensable liquid volatile matter into said condensate separator means, and to discharge non condensable volatile matter gas into said receiver of non condensable gas volatile matter;

whereby heat is transferred out of said steam and volatile matter, through said surface, and into said cooling water, and steam and condensable volatile matter are condensed to liquid volatile matter and steam condensate;

wherein said condensate separator means is operative to separate condensable liquid volatile matter from steam condensate, and to discharge said condensable liquid volatile matter into said receiver of condensable volatile matter, and to discharge said steam condensate into said receiver of steam condensate;

wherein said condensate separator means is a separator means selected from the group of separator means consisting of, centrifuge separator means, and flotation separator means;

whereby said steam and volatile matter, separated from devolatilized coke in said devolatilization reactor chamber, is further separated into three volatile matter fuel products, a tar volatile matter fuel, a gas volatile matter fuel, and a liquid volatile matter fuel.

3. Apparatus for separating carbonaceous fuels, such as coal and biomass, into two or more separated fuel products, a devolatilized coke product, and one or more volatile matter products, as described in claim 2:

wherein said receiver of devolatilized coke chunks is a coke quench chamber;

wherein said steam boiler source of superheated steam is additionally a source of essentially saturated steam;

and further comprising: a source of quench water at a pressure greater than said steam boiler pressure; a receiver of quenched coke chunks;

said coke quench chamber comprising a sealable pressure vessel coke quench chamber, with a hot coke receiver end sealably receiving coke from said devolatilization reactor chamber via said coke removal transfer means, and with a quenched coke removal end fitted with a quenched coke removal means for sealably transferring quenched coke from said quenched coke removal end into said receiver of quenched coke chunks;

said coke quench chamber further comprising a wet steam mixer chamber comprising: a saturated steam inlet pipe and saturated steam inlet valve for transferring saturated steam from said source of saturated steam into said mixer chamber; a quench water inlet pipe and quench water valve for transferring quench water from said source of quench water into said mixer chamber via a quench water spray nozzle aligned with said saturated steam inlet pipe so that saturated steam and quench water are mixed together to create wet steam; a wet steam inlet pipe connecting said wet steam mixer chamber to the hot coke receiver end of said coke quench chamber;

said coke quench chamber further comprising a reheated steam discharge pipe and reheated steam discharge valve for discharging reheated steam from the quenched coke removal end of said coke quench chamber into that one side of said steam surface condenser receiving steam and low density volatile matter from said steam centrifuge means;

wherein said carbonaceous fuel control and actuator means is further operative upon said quenched coke removal means so that, at the end of each refuel time interval, a single batch of quenched coke chunks is transferred, from said quenched coke removal end of said coke quench chamber, into said receiver of quenched coke chunks by said quenched coke removal means, before a single batch of devolatilized coke fuel chunks is transferred, from the coke removal end of said devolatilization reactor chamber, into said coke quench chamber receiver of devolatilized coke chunks, by said coke removal transfer means;

whereby each devolatilized coke batch moves, in steps, from the hot coke receiver end of said coke quench chamber, toward said quenched coke removal end of said coke quench chamber, each step taking place at the end of each refuel time interval, and each devolatilized coke batch reaches the quenched coke removal end of said coke quench chamber after a number of refuel time intervals, following entry, essentially equal to the number of devolatilized coke fuel batches inside said coke quench chamber, and each devolatilized coke batch is removed from said coke quench chamber, at the end of the next refuel time interval after reaching said quenched coke removal end and is transferred into said receiver of quenched coke chunks;

a separate wet steam control and actuator means for opening and closing said saturated steam valve, said quench water valve, and said reheated steam discharge valve, intermittently at wet steam cycle time intervals, so that an integral number of wet steam cycles, of steam compression into said coke quench chamber, followed after a quench time interval by reheated steam release from said coke quench chamber, takes place during each refuel time interval, each said wet steam cycle comprising the following sequence of steps:

the reheated steam valve is closed;

the saturated steam valve and quench water valve are concurrently opened to admit saturated steam and quench water together into said wet steam mixer chamber to create wet steam which is compressed into said coke quench chamber at steam boiler pressure;

after a wet steam cycle time interval said saturated steam valve and said quench water valve are concurrently closed;

the reheated steam valve is opened to discharge reheated steam into that one side of said steam surface condenser receiving steam and low density volatile matter from said steam centrifuge means;

whereby by thus operating the coke quench chamber over a range of wet steam pressure, during each of several wet steam cycles, wet steam is repeatedly compressed into the interchunk spaces and pore spaces of the hot devolatilized coke chunks during each wet steam compression, and heat is transferred rapidly into said wet steam from said hot devolatilized coke chunks to decrease the temperature and quench the coke chunks;

and further whereby the thusly quenched coke batches are delivered into said receiver of quenched coke by said quenched coke removal means;

and further whereby thusly reheated steam is discharged from the quenched coke removal end of said coke quench chamber into that one side of said steam surface condenser receiving steam and low density volatile matter from said steam centrifugal means, at the end of each wet steam cycle.

4. Apparatus for separating carbonaceous fuels, such as coal and biomass into two or more separated fuel products, a devolatilized coke product, and one or more volatile matter products, as described in claim 3:

wherein said source of carbonaceous fuel chunks containing volatile matter comprises a coal preheat chamber, with a primary fuel receiver end, and a preheated coal discharge end;

a primary source of primary carbonaceous fuel chunks containing volatile matter;

a primary fuel transfer means for intermittently and sealably transferring a single batch of carbonaceous fuel chunks, from said primary source of carbonaceous fuel chunks, into said primary fuel transfer end of said coal preheat chamber;

wherein said refuel means intermittently and sealably transfers a single batch of preheated carbonaceous fuel chunks, from the preheated coal transfer end of said coal preheat chamber, into said refuel end of said devolatilization reactor chamber;

said coal preheat chamber further comprising: a reheated steam inlet pipe, at said preheated coal transfer end of said coal preheat chamber, and connected to said reheated steam discharge pipe of said coke quench chamber; a cooled steam discharge pipe at said primary fuel transfer end of said coal preheat chamber, and connected to that one side of said steam surface condenser receiving steam and low density volatile matter from said steam centrifuge means;

whereby said coal preheat chamber is steam flow interposed, between said coke quench chamber, and that one side of said steam surface condenser receiving steam and low density volatile matter from said steam centrifuge means, so that the reheated steam discharged from said coke quench chamber, flows next through said coal preheat chamber, before being discharged that one side of said steam surface condenser receiving steam and low density volatile matter from said steam centrifuge means;

and further whereby the temperature of said carbonaceous fuel chunks is increased by the thruflow of reheated steam through said coal preheat chamber;

wherein said carbonaceous fuel control and actuator means is further operative upon said primary fuel transfer means so that, at the end of each refuel time interval, a batch of primary carbonaceous fuel chunks is sealably transferred from said source of primary carbonaceous fuel chunks, into said primary fuel transfer end of said coal preheat chamber, by said primary fuel transfer means, after said refuel means has transferred a single batch of preheated carbonaceous fuel chunks, from the preheated coal transfer end of said coal preheat chamber, into said refuel end of said devolatilization reactor chamber.

5. A process for dividing a batch of carbonaceous fuel chunks, such as coal or biomass fuel into a devolatilized solid coke product, and a separated volatile matter product, and comprising applying the following sequence of process steps to each batch of carbonaceous fuel:

said batch of carbonaceous fuel is placed inside a pressure vessel chamber;

a compression and release steam cycle is applied to said batch of carbonaceous fuel chunks, by compressing superheated steam into said batch of carbonaceous fuel chunks, up to a compression pressure, followed by discharging steam and a separated volatile matter batch together out of said batch of carbonaceous fuel chunks, down to a discharge pressure less than said compression pressure;

whereby superheated steam is compressed into the interchunk spaces and pore spaces of the carbonaceous fuel chunks during each steam compression, and heat is transferred rapidly into said carbonaceous fuel chunks, by direct contact, over pore and interchunk areas, between steam and carbonaceous fuel chunks, to increase the temperature thereof; as carbonaceous fuel temperature is thusly increased the volatile matter portions become vaporized and liquefied and thermally cracked, and are forced out of the carbonaceous fuel chunks by such vaporization, and are mixed into the steam, thus creating additional pore spaces in the carbonaceous fuel chunks;

and further whereby each volatile matter batch, forced out of the carbonaceous fuel chunks and mixed into the steam, is discharged out of said pressure vessel chamber during the steam release portion of each steam cycle, and is thus separated from each carbonaceous fuel batch;

said compression and release steam cycle is repeated several times on each said batch of carbonaceous fuel chunks;

and further whereby additional volatile matter batches are thusly separated from each batch of carbonaceous fuel chunks, during each of the several repeated steam cycles;

whereby each batch of carbonaceous fuel chunks is separated into a solid devolatilized coke product and several batches of volatile matter product mixed into steam and removed from said devolatilized coke product.

6. A process for dividing a batch of carbonaceous fuel chunks, such as coal or biomass fuel, into a devolatilized coke product and a separated volatile matter product, as described in claim 5, and further comprising applying the following additional sequence of process steps to each batch of separated volatile matter product and the steam admixed therewith:

mixing each said batch of separated volatile matter product and steam into cooling water;

whereby steam and condensable portions of said volatile matter are condensed to liquid, and non condensable gas portions of said volatile matter product are separated as a gas fuel product from said volatile matter product and said cooling water and condensed steam;

transferring the remaining condensable portions of said volatile matter product, together with the cooling water and condensed steam, into a quiescent settling tank;

whereby, after a settling time period, those tar volatile matter portions, of higher density than cooling water and condensed steam, separate and settle to the bottom of said settling tank, and those liquid volatile matter portions, of lower density than cooling water and condensed steam, separate and float to the top of the settling tank;

whereby each batch of separated volatile matter product is thusly further separated into, a gas fuel product, a liquid fuel product of lower density than water, a tar fuel product of greater density than water, and these thusly separated from the cooling water and condensed steam.

7. Apparatus for separating carbonaceous fuels, such as coal and biomass, into two or more separated fuel products, a devolatilized coke product and one or more volatile matter products, as described in claim 1:

wherein said receiver of steam and volatile matter comprises, a barometric condenser, a condensate receiver tank, and a receiver of non condensable gases;

said barometric condenser comprising, an enclosed steam and cooling water mixing chamber, at steam and cooling water mixer chamber pressure, a source of cooling water at cooling water supply pressure greater than said steam and cooling water mixer pressure;

said enclosed steam and cooling water mixing chamber comprising: a steam inlet connection to said steam outlet pipe of said devolatilization reactor chamber; several cooling water spray nozzles, connected to said source of cooling water, and aligned relative to said steam inlet connection so that steam and volatile matter entering said mixing chamber from said devolatilization reactor chamber will be mixed with cooling water entering said mixing chamber, and so that steam and condensable volatile matter will be condensed and mixed into said cooling water; gas transfer means for transferring non condensable gases from the top of said mixing chamber into said receiver of non condensable gases; a barometric condenser discharge pipe for transferring cooling water, steam condensate, and condensable volatile matter and tars, from the bottom of said mixing chamber into said condensate receiver tank;

said condensate receiver tank comprising an enclosure of sufficient volume to permit gravity separation of insoluble volatile matter material from cooling water and steam condensate within said enclosure, and said enclosure top is vented to atmosphere;

whereby water insoluble volatile matter material of lower density than the water in the condensate receiver tank will float to the top surface in the condensate receiver tank, and water insoluble tar volatile matter of greater density than the water in the condensate receiver tank will sink to the bottom of the condensate receiver tank, and the cooling water and steam condensate will float in the middle of the condensate receiver tank between the two separated layers of water insoluble volatile matter material;

a cooling water and steam condensate receiver;

a receiver of water insoluble liquid volatile matter whose density is less than water in said condensate receiver tank;

a receiver of water insoluble tar volatile matter whose density is greater than water in said condensate receiver tank;

means for removing water insoluble volatile matter, whose density is less than water density, from the top of the condensate receiver tank, whenever the top liquid surface exceeds a preset liquid volatile matter level, and for transferring said water insoluble volatile matter into said receiver of water insoluble liquid volatile matter whose density is less than that of the water;

means for removing water insoluble volatile matter, whose density is greater than water density, from the bottom of the condensate receiver tank, whenever the level of water insoluble volatile matter whose density exceeds that of the water exceeds a preset tar volatile matter level, and for transferring said water insoluble tar volatile matter into said receiver of water insoluble tar volatile matter whose density is greater than that of the water;

means for removing cooling water and steam condensate from the middle of the condensate receiver tank, whenever the level of cooling water and condensate exceeds a preset cooling water level, and for transferring said cooling water and steam condensate into said receiver of cooling water and steam condensate;

wherein said preset liquid volatile matter level is above said preset cooling water level, and said preset cooling water level is above said preset tar volatile matter level;

whereby the volatile matter removed from the original carbonaceous fuel, while inside the devolatilization reactor chamber, is further separated, by said barometric condenser and condensate receiving tank, into three separated fuel products; a non condensable gas fuel product, a liquid volatile matter fuel product of density less than water, and a tar volatile matter fuel product of density greater than water.

8. Apparatus for separating carbonaceous fuels, such as coal and biomass, into two or more separated fuel products, a devolatilized coke product, and one or more volatile matter products, as described in claim 7:

wherein said receiver of devolatilized coke chunks is a coke quench chamber;

wherein said steam boiler source of superheated steam is additionally a source of essentially saturated steam;

and further comprising: a source of quench water at a pressure greater than said steam boiler pressure; a receiver of quenched coke chunks;

said coke quench chamber comprising a sealable pressure vessel coke quench chamber, with a hot coke receiver end sealably receiving coke from said devolatilization reactor chamber via said coke removal transfer means, and with a quenched coke removal end fitted with a quenched coke removal means for sealably transferring quenched coke from said quenched coke removal end into said receiver of quenched coke chunks;

said coke quench chamber further comprising a wet steam mixer chamber comprising: a saturated steam inlet pipe and saturated steam inlet valve for transferring saturated steam from said source of saturated steam into said mixer chamber; a quench water inlet pipe and quench water valve for transferring quench water from said source of quench water into said mixer chamber via a quench water spray nozzle aligned with said saturated steam inlet pipe so that saturated steam and quench water are mixed together to create wet steam; a wet steam inlet pipe connecting said wet steam mixer chamber into the hot coke receiver end of said coke quench chamber;

said coke quench chamber further comprising a-reheated steam discharge pipe and reheated steam discharge valve for discharging reheated steam from the quenched coke removal end of said coke quench chamber into said steam and cooling water mixing chamber of said barometric condenser;

wherein said carbonaceous fuel control and actuator means is further operative upon said quenched coke removal means so that, at the end of each refuel time interval, a single batch of quenched coke chunks is transferred, from said quenched coke removal end of said coke quench chamber, into said receiver of quenched coke chunks by said quenched coke removal means, before a single batch of devolatilized coke fuel chunks is transferred, from the coke removal end of said devolatilization reactor chamber, into said coke quench chamber receiver of devolatilized coke chunks, by said coke removal transfer means;

whereby each devolatilized coke batch moves, in steps, from the hot coke receiver end of said coke quench chamber, toward said quenched coke removal end of said coke quench chamber, each step taking place at the end of each refuel time interval, and each devolatilized coke batch reaches the quenched coke removal end of said coke quench chamber after a number of refuel time intervals, following entry, essentially equal to the number of devolatilized coke fuel batches inside said coke quench chamber and each devolatilized coke batch is removed from said coke quench chamber, at the end of the next refuel time interval after reaching said quenched coke removal end and is transferred into said receiver of quenched coke chunks;

a separate wet steam control and actuator means for opening and closing said saturated steam valve, said quench water valve, and said reheated steam discharge valve, intermittently at wet steam cycle time intervals, so that an integral number of wet steam cycles, of steam compression into said coke quench chamber, followed after a quench time interval by reheated steam release from said coke quench chamber, takes place during each refuel time interval, each said wet steam cycle comprising the following sequence of steps:

the reheated steam valve is closed;

the saturated steam valve and quench water valve are concurrently opened to admit saturated steam and quench water together into said wet steam mixer chamber to create wet steam which is compressed into said coke quench chamber at steam boiler pressure;

after a wet steam cycle time interval said saturated steam valve and said quench water valve are concurrently closed;

the reheated steam valve is opened to discharge reheated steam into said steam and cooling water mixing chamber of said barometric condenser;

whereby by thus operating the coke quench chamber over a range of wet steam pressure, during each of several wet steam cycles, wet steam is repeatedly compressed into the interchunk spaces and pore spaces of the hot devolatilized coke chunks during each wet steam compression, and heat is transferred rapidly into said wet steam from said hot devolatilized coke chunks to decrease the temperature and quench the coke chunks;

and further whereby the thusly quenched coke batches are delivered into said receiver of quenched coke by said quenched coke removal means;

and further whereby thusly reheated steam is discharged from the quenched coke removal end of said coke quench chamber into said steam and cooling water mixing chambers of said barometric condenser at the end of each wet steam cycle.

9. Apparatus for separating carbonaceous fuels, such as coal and biomass, into two or more separated fuel products, a devolatilized coke product, and one or more volatile matter products, as described in claim 8:

wherein said source of carbonaceous fuel chunks containing volatile matter comprises a coal preheat chamber, with a primary fuel receiver end, and a preheated coal discharge end;

a primary source of primary carbonaceous fuel chunks containing volatile matter;

a primary fuel transfer means for intermittently and sealably transferring a single batch of carbonaceous fuel chunks, from said primary source of carbonaceous fuel chunks, into said primary fuel transfer end of said coal preheat chamber;

wherein said refuel means intermittently and sealably transfers a single batch of preheated carbonaceous fuel chunks, from the preheated coal transfer end of said coal preheat chamber, into said refuel end of said devolatilization reactor chamber;

said coal preheat chamber further comprising: a reheated steam inlet pipe, at said preheated coal transfer end of said coal preheat chamber, and connected to said reheated steam discharge pipe of said coke quench chamber; a cooled steam discharge pipe at said primary fuel transfer end of said coal preheat chamber, and connected to the steam and cooling water mixing chamber of said barometric condenser;

whereby said coal preheat chamber is steam flow interposed, between said coke quench chamber, and said steam and cooling water mixing chamber of said barometric condenser, so that the reheated steam discharged from said coke quench chamber, flows next through said coal preheat chamber, before being discharged into said steam and cooling water mixing chamber of said barometric condenser;

and further whereby the temperature of said carbonaceous fuel chunks is increased by the thruflow of reheated steam through said coal preheat chamber;

wherein said carbonaceous fuel control and actuator means is further operative upon said primary fuel transfer means so that, at the end of each refuel time interval, a batch of primary carbonaceous fuel chunks is sealably transferred from said source of primary carbonaceous fuel chunks, into said primary fuel transfer end of said coal preheat chamber, by said primary fuel transfer means, after said refuel means has transferred a single batch of preheated carbonaceous fuel chunks, from the preheated coal transfer end of said coal preheat chamber, into said refuel end of said devolatilization reactor chamber.

\* \* \* \* \*